[72] Inventor Paul E. Nelson
Rochester, Minn.

[21] Appl. No. 743,128
[22] Filed July 8, 1968
[45] Patented June 28, 1971
[73] Assignee International Business Machines Corporation
Armonk, N.Y.

[54] MARK READ APPARATUS USING SMALL RASTER
11 Claims, 6 Drawing Figs.

[52] U.S. Cl. ........ 235/61.11
[51] Int. Cl. ........ G06k 7/10
[50] Field of Search ........ 235/61.603, 61.11, 61.115 (CRT); 340/146.3

[56] References Cited

UNITED STATES PATENTS

| | | | |
|---|---|---|---|
| 3,058,093 | 10/1962 | Vernon et al. | 340/146.3 |
| 3,112,468 | 11/1963 | Kamentsky | 340/146.3 |
| 3,433,933 | 3/1969 | Hardin | 235/61.115 |
| 3,458,688 | 7/1969 | Garry et al. | 235/61.11 |

*Primary Examiner*—Daryl W. Cook
*Assistant Examiner*—William W. Cochran
*Attorney*—Sughrue, Rothwell, Mion, Zinn and MacPeak

ABSTRACT: An optical system for reading marks on a document. Each mark area is scanned by a beam in a raster pattern. The number of times which a mark is encountered during the raster pattern scan of a mark area provides an indication of the existence of a mark and the strength of the existing mark. Orientation for the raster pattern scans is provided by a timing mark associated with a line of mark areas.

INVENTOR
PAUL E. NELSON
BY Sughrue, Rothwell, Mion
Zinn & Macpeak
ATTORNEYS

MARK READ APPARATUS USING SMALL RASTER

BACKGROUND OF THE INVENTION

1. Field of the Invention

The invention is in the field of optical mark readers for reading marks on a document.

2. Description of the Prior Art

It is known in the prior art to provide optical sensing systems which sense the presence or absence of marks in mark areas on a document. In such systems, the optical beam is deflected across a mark area causing a video output if the beam encounters a mark during its excursion. A partially erased mark, an error not uncommon, and dark smudges in marked areas will be read erroneously as marks.

SUMMARY OF THE INVENTION

In accordance with the present invention, a system is provided for optically reading marks on a document having mark areas, with each line of mark areas being identified by a special timing mark. The timing mark is used to properly orient the optical scanning beam with the line of mark areas. The beam is deflected to perform a raster pattern scan in each mark area, thus causing the beam to encounter a mark, if present, a plurality of times. The number of encounters, in the form of MARK SENSE output signals, are accumulated for each mark area and provide a measure of the existence and strength of a mark in the scanned area. The number of beam excursions during the raster scan of each mark area is predetermined and controlled so that following the last predetermined excursion, the beam is shifted to the next mark area.

DETAILED DESCRIPTION OF THE DRAWINGS

Figure 1:
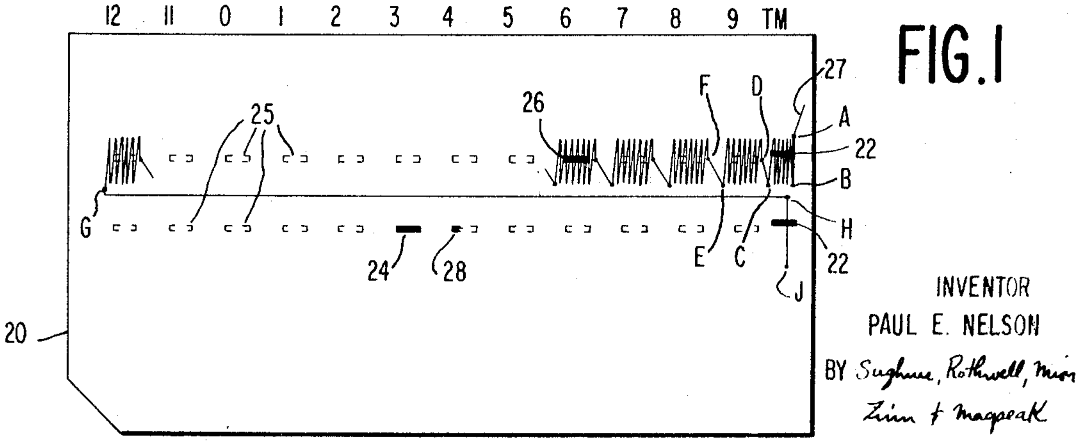
FIG. 1 is an illustration of a document on which there are located marks capable of being read by the present invention.

Referring to FIG. 1, there is shown a card 20 which is an example of the type of document which may be read by the mark reader of the present invention. The document may include a plurality of lines of mark areas with the mark areas being separated in each line along a first coordinate axis and each line of mark areas being displaced along a second coordinate axis. In the specific document shown in FIG. 1, the lines of mark areas are in a horizontal direction and the lines are separated from one another in a vertical direction. Two lines of mark areas are illustrated, although it will be apparent to anyone of ordinary skill in the art that multiple lines may be included on the document. There are 12 mark areas within each line, numbered 0—12 and indicated by the corresponding numbers on the top of card 20. Typical of the type of document considered herein are those which include identifying indicia, such as indicated at 25. A mark may be placed on a document by darkening an area, such as indicated by the mark 26 in the first line of marks and the mark 24 in the second line of marks. Note that mark 26 is in mark area six of the first or upper line, and mark 24 is in mark area thereof the second or lower line.

One common error in using documents of this type is to mark the wrong area, partially erase the wrong mark and then mark the correct area. This is indicated by partially erased mark 28 which is in mark area number four. Thus, for example, the user may have read the number three on a meter or may have chosen a number three as an answer to a certain test that he is taking, and erroneously blackened the adjacent mark area number four. Upon seeing this, he may then have incompletely erased the mark area number four and fill in the proper mark area number three, as indicated by the mark 24.

Each line of mark areas has a timing mark, 22, associated therewith. The timing mark is always present and provides a reference point for the optical beam. The timing marks are slightly vertically displaced with respect to the lines of mark areas that they identify. The purpose of this will be explained hereafter.

The manner in which the document is scanned will now be explained with reference to the scanning line 27 which represents the beam position as it is scanned across the document. As is well known, in optical reading systems, when a beam is turned on and not presently reading a document, the beam is executing a mode of operation referred to as aging. The purpose of aging is merely to move the beam around in no particular manner so that it does not concentrate on a single area spot and thereby burn out the face of the flying spot scanner at that spot.

After the document is placed in the proper position, by means forming no part of the present invention, the beam enters a SEEK mode wherein it is deflected to a first reference point A under command of coordinate input signals which may be externally generated, for example, by a central processing unit. The reference point A is a point somewhere above the timing mark of the first line of mark areas. From point A the beam moves straight down as indicated by portion AB of line 27. When the beam encounters the timing mark 22 this is noted by the system and the beam is stopped at point B, a predetermined distance below the timing mark. Point B is stored and provides a vertical reference for the raster scans of the mark areas in the first line.

After reaching point B, the beam executes a small raster scan, which, in the specific example described herein, comprises 42 microsecond upsweeps, during which time mark encounters are detected, and 6 microsecond flybacks or downsweeps. During the 6 microsecond flybacks the beam moves 4.4 mils to the left. The height of the raster, which may be referred to as a small raster because of its size, is 160 mils. Thus, as indicated in FIG. 1, upon reaching point B, the beam scans straight up and then down and slightly to the left, and the beam continues in this pattern.

On the first upsweep following the time that the beam has moved to the left of timing mark 22, a fast horizontal sweep is added to the upsweep for the purpose of causing the beam to quickly jump over to the next adjacent mark area. This is indicated generally by portion CD of scan line 27. The fast left sweep is only on during a portion of the upsweep. That portion of time is determined by the distance between the timing mark area and mark area number nine. When the beam reaches point D it continues to perform its small raster pattern, this time scanning mark area number nine. While the beam is scanning a mark area, such as mark area number nine, the upsweeps or scans are counted and following a predetermined number of scans, the fast left sweep is again turned on to cause the beam to jump over to the next adjacent mark area. This is indicated by portion EF of scan line 27 wherein the beam jumps from the left edge of mark area number nine to the right edge of mark area number eight.

It should be noted at this point, that although the distance between mark areas and the distance between the timing mark and the mark area adjacent the timing mark are not critical to the present invention, the specific example described herein was designed for reading documents in which the distance between mark areas is 150 mils and the distance between the timing mark and mark area number nine is 100 mils. Thus, in causing the beam to jump between adjacent mark areas, the fast left sweep may be turned on for approximately 30 microseconds (causing it to move 150 mils to the left), whereas in causing the beam to jump from the timing mark area to mark area number nine, the fast left sweep is turned on for only 20 microseconds (causing the beam to move left 100 mils).

In the manner just described, the beam performs a raster pattern scan in each of the mark areas until it completes the raster pattern scan of mark area number twelve as indicated at point G on the scan line 27. At this point, the seek mode is reentered and the beam travels to point H which has been stored as the result of information obtained during the scan of the upper timing mark 22. From point H, the scan format is then repeated on the second line in the same manner as indicated above for the first line. Only the fast downsweep, in which the system is looking for the timing mark 22, is shown in the FIG. This is indicated by portion HJ of the scan line 27.

In a specific example described herein, there are 19 upsweeps or scans in the raster pattern scan each mark area, with the 20th upsweep being altered by the turn-on of the fast left sweep to move the beam between mark areas. During the 19 scans, each beam encounter with a mark results in a MARK SENSE output signal, the total number of MARK SENSE output signals being accumulated for each mark area. Thus, the mark area 26 may result in 14 or 15 MARK SENSE outputs indicating the presence of a mark in mark area number six. The partially erased mark 28 may result in six or seven MARK SENSE outputs. Depending upon the setting of the system, or the particular desires of the user, this low number of MARK SENSE output signals may be rejected or as an alternative may be identified as a mark existing in mark area number four with the concomitant identification that it is a weak mark. The operator or computer will be informed that the second line includes a strong mark in mark area number three and a weak mark in mark area number four. The operator or programmer may reject the weak mark under these circumstances since they indicate a partially erased mark in mark area number four.

Figure 2:
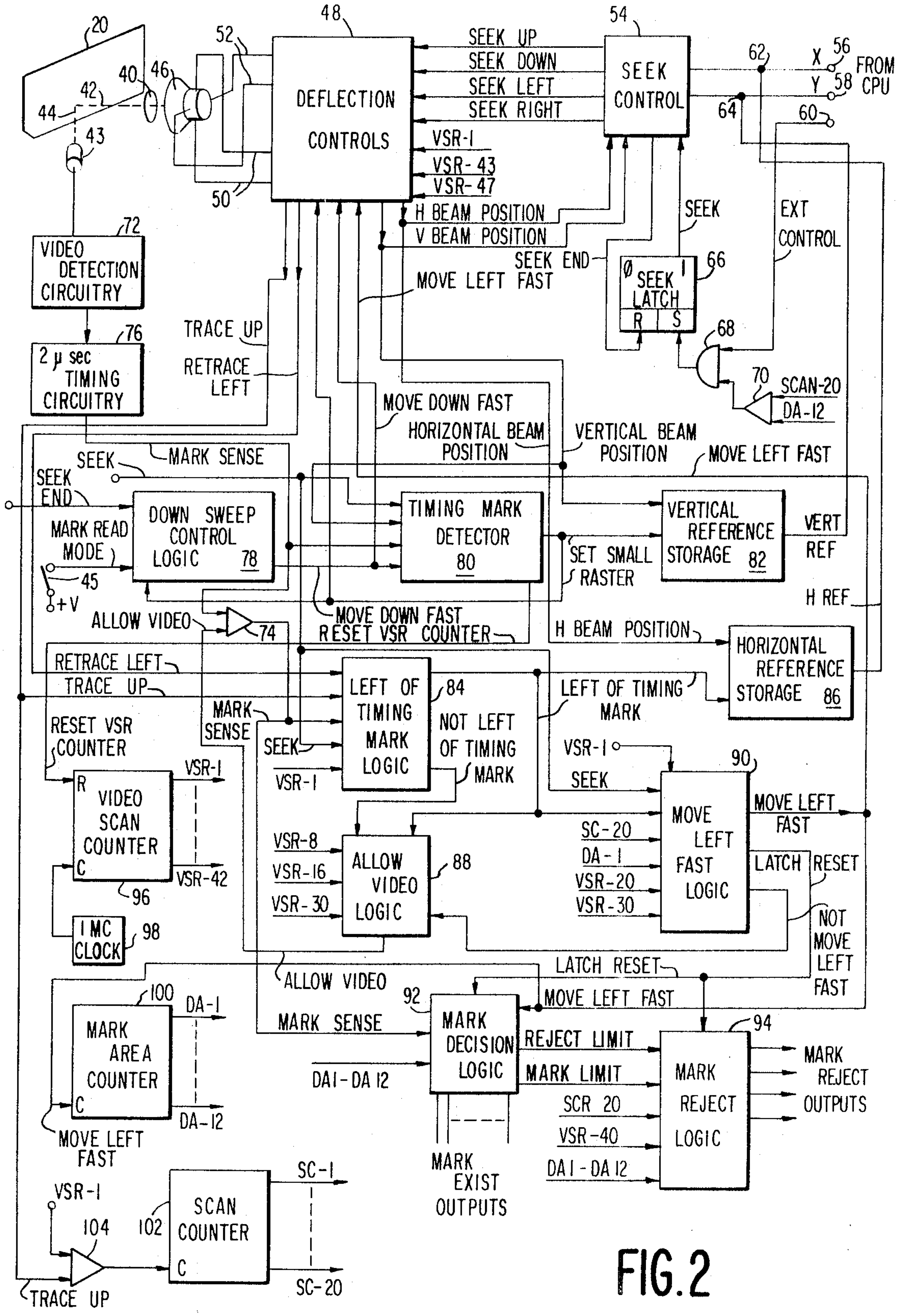
FIG. 2 is a system block diagram of a preferred embodiment of the present invention.

Referring now to FIG. 2, there is shown a system block diagram of a preferred embodiment of the present invention. During the description of FIG. 2 and also the remaining figures, the following common convention is used for describing signals passing between the logic or block units.

Each line connecting the output of one logic element or block to the input of a second logic element or block is labeled by a word, symbol, or group of words. In the description, the word, symbol, or group of words is used to indicate the signal voltage or current on that line. When the signal is set to be "up" or "present," it means that the signal on the line is of the proper state to energize the logic element or elements to which it is connected.

The apparatus of FIG. 2 includes a flying spot scanner comprising optical system 40, a cathode-ray tube 46 in combination with optical system 40 directs a beam 42 toward the document 20 resulting in a reflected beam 44 which is detected by the photomultiplier tube 43.

The output of photomultiplier tube is connected in succession to a video detection circuitry 72, a 2 microsecond timing circuit 76 and an AND gate 74. Each of the latter circuits are common in optical reading apparatus of the prior art and operate to provide at the output of the 2 microseconds timing circuit 76 a video or MARK SENSE output signal each time the beam 42 encounters a mark on the document 20. The function of AND GATE 74 is to pass only those MARK SENSE outputs which occur at certain times during each upsweep of the raster pattern scan. The gating time of AND gate 74 is controlled by an ALLOW VIDEO input which will be explained more fully hereinafter. The 2 microsecond timing circuit 76 may be a 2 microsecond active delay line which provides a MARK SENSE output signal only if the input video applied thereto lasts for at least 2 microseconds. As a result of this circuit, if the beam 42 encounters a very thin line on the document, not a mark, there will be no output from timing circuit 76.

The movement of beam 42 is controlled by the deflection controls 48 whose outputs are connected via leads 52 to the horizontal deflection coil in cathode-ray tube 46 and via leads 50 to the vertical deflection coils of the cathode-ray tube 46. The horizontal and vertical deflection coils are not shown in FIG. 2. The deflection controls 48, which will be described in detail in connection with FIG. 3, operate in response to control inputs to cause the beam 42 to be deflected in the manner indicated in FIG. 1 and described above. There are four output signals from the deflection controls 48 in addition to the outputs which control horizontal and vertical deflection. They are the H BEAM POSITION and the V BEAM POSITION, representing, by analog voltages or currents, the horizontal and vertical positions of the beam, a TRACE-UP control signal and a RETRACE LEFT control signal. The TRACE-UP signal is present during the upsweep of the small raster scan and the RETRACE LEFT signal is present during the flyback portion of the small raster scan.

The SEEK mode of operation is controlled by a SEEK control 54, SEEK latch 66, OR gate 68, and AND gate 70. The SEEK control 54 may be any unit, of a type well known in the art, which receives coordinate input signals at input terminals 62 and 64 and commands the deflection controls 48 to move the beam up, down, left, or right to properly position the beam at the point defined by the coordinate inputs at input terminals 62 and 64. The SEEK control unit 54 monitors the exact beam position via the H BEAM POSITION and the V BEAM POSITION input signals. The SEEK control 54 is energized by the SEEK output from the SEEK latch 66 and provides a SEEK END output when the commanded position has been reached. The SEEK END output resets the SEEK latch 66 thus turning off the seek control 54. The initial X and Y position coordinates applied to input terminals 62 and 64 are taken from terminals 56 and 58 which may be connected to any external source. Typically the initial inputs will come from a central processing unit which also provides an external control input at a terminal 60 for turning on the SEEK latch 66 via the OR gate 68. Following the initial referencing of the beam by the coordinate inputs at terminals 56 and 58, the SEEK CONTROL 54 will be commanded by the H REFERENCE and V REFERENCE signals which are also applied to input terminals 62 and 64, and which will be described more fully hereinafter.

The remaining system blocks of FIG. 2 may be divided into three groups. They are the control logic, the detection logic, and the counters. The control logic includes the downsweep control logic 78, timing mark detector 80, vertical reference storage 82, left of timing mark logic 84, horizontal reference storage 86, allow video logic 88, and the move left fast logic 90. The control logic is shown in detail in FIG. 4. The counters include the video scan counter 96 and its associated 1 megacycle clock pulse generator 98, the mark area counter 100 and the scan counter 102. The video scan counter 96 has 48 outputs identified respectively as VSR1 through VSR48. VSR1 through VSR42 represent the 42 microsecond intervals in each upsweep of the raster pattern scan. Outputs VSR43 through VSR48 represent the 6 microsecond intervals in each flyback of the raster pattern scan. The mark area counter 100 keeps track of the mark area presently being scanned. It has 12 outputs DA1 through DA12 representing the mark areas 9 through 0 and 11 through 12, respectively. The scan counter 102 has 20 outputs, represented respectively by SC1 through SC20. These outputs represent the number of scans or upsweeps performed in the mark area presently being scanned.

Figures 5, 6:
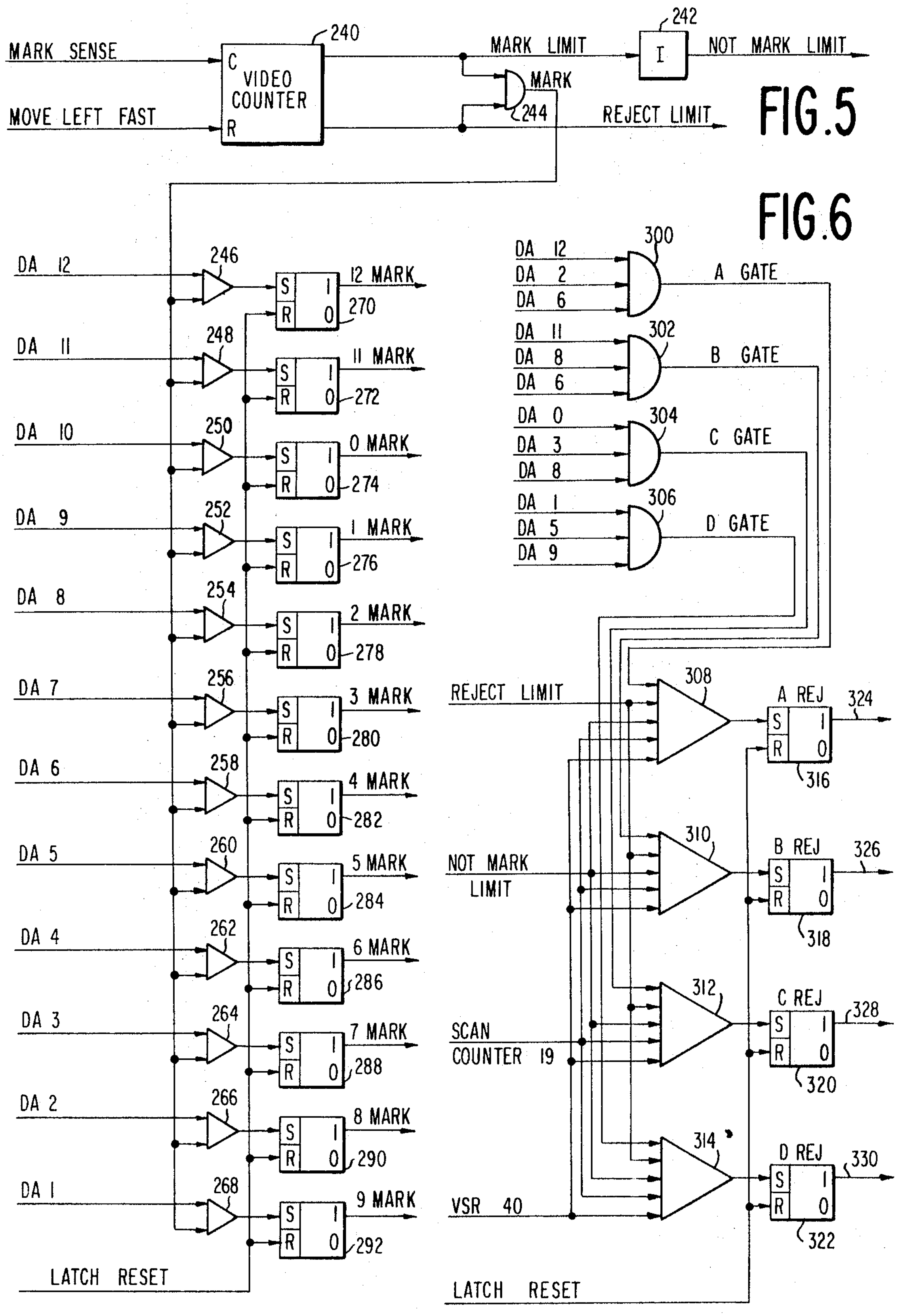
FIG. 5 is a logic block diagram of the mark decision logic of FIG. 2.
FIG. 6 is a logic block diagram of the mark reject logic of FIG. 2.

The third group, which is the decision logic, includes the mark decision logic 92, illustrated in greater detail in FIG. 5, and the mark reject logic 94, illustrated in greater detail in FIG. 6.

The operation of the system shown in FIG. 2 will now be described with reference to the scan indicated in FIG. 1. At the start time, COORDINATE input signals X and Y are applied to terminals 56 and 58, respectively, and an EXTERNAL CONTROL signal is applied to input terminal 60. The X and Y signals, which represent the horizontal and vertical coordinates of reference position A, are connected to the input terminals 62 and 64 of the SEEK control unit 54. The EXTERNAL CONTROL signal sets the SEEK latch 66 via OR GATE 68, thus providing a SEEK output signal which turns on the SEEK control unit 54. The SEEK control unit then sends the proper signals to the deflection controls 48 to cause the beam 42 to move to reference position A. When the beam moves to the position determined by the X and Y input signals, the SEEK control 54 provides a SEEK END output which resets SEEK latch 66 and stops the SEEK MODE operation. The SEEK END signal is also connected to the downsweep control logic 78. Switch 45, will have been closed, either manually or by some external control means, to provide a MARK READ MODE input to the downsweep control logic 78. The latter switch is closed whenever the system is used for reading marks on a document.

The downsweep control logic 78 operates in response to the SEEK END input, to provide a MOVE DOWN FAST output signal which is applied to the deflection controls 48 and also to the timing mark detector 80. When the deflection controls 48 receive the MOVE DOWN FAST signal, it causes the beam 42 to move straight down as indicated by portion AB of line 27 (FIG. 1). The MOVE DOWN FAST signal also informs the timing mark detector 80 that the system is now searching for the timing mark. Other inputs to the timing mark detector 80 are the MARK SENSE signal, the V BEAM POSITION signal, and the SEEK input.

The timing mark detector 80 operates generally as follows: The vertical beam position is monitored and when the MOVE DOWN FAST signal is received, indicating that it is time to look for the timing mark, the timing mark detector checks the MARK SENSE input line thereto. As soon as the beam reaches the timing mark there will be a MARK SENSE input to the timing mark detector 80. At this time the V BEAM POSITION, representing the vertical coordinate of the timing mark, is held in the timing mark detector 80. After the beam moves down a predetermined distance below the detected vertical position of the timing mark, the timing mark detector 80 provides a SET SMALL RASTER output signal. The SET SMALL RASTER output signal occurs at the same time that the beam reaches position B (FIG. 1). The timing mark detector 80 also provides a second output, referred to as the RESET VSR COUNTER output. The latter output is the inverse of the SET SMALL RASTER output and operates to reset or start the video scan counter 96. Thus, during the fast downsweep the RESET VSR COUNTER output signal will be present thereby preventing the video scan counter 96 from counting the 1 megacycle clock inputs thereto. However, as soon as the SET SMALL RASTER output signal occurs, the reset input to the counter 96 is removed, thereby allowing the counter to begin accumulating the 1 megacycle input clock pulses. It will be noted that this latter removal of the reset input occurs in time with the start of the small raster scan.

Figure 3:
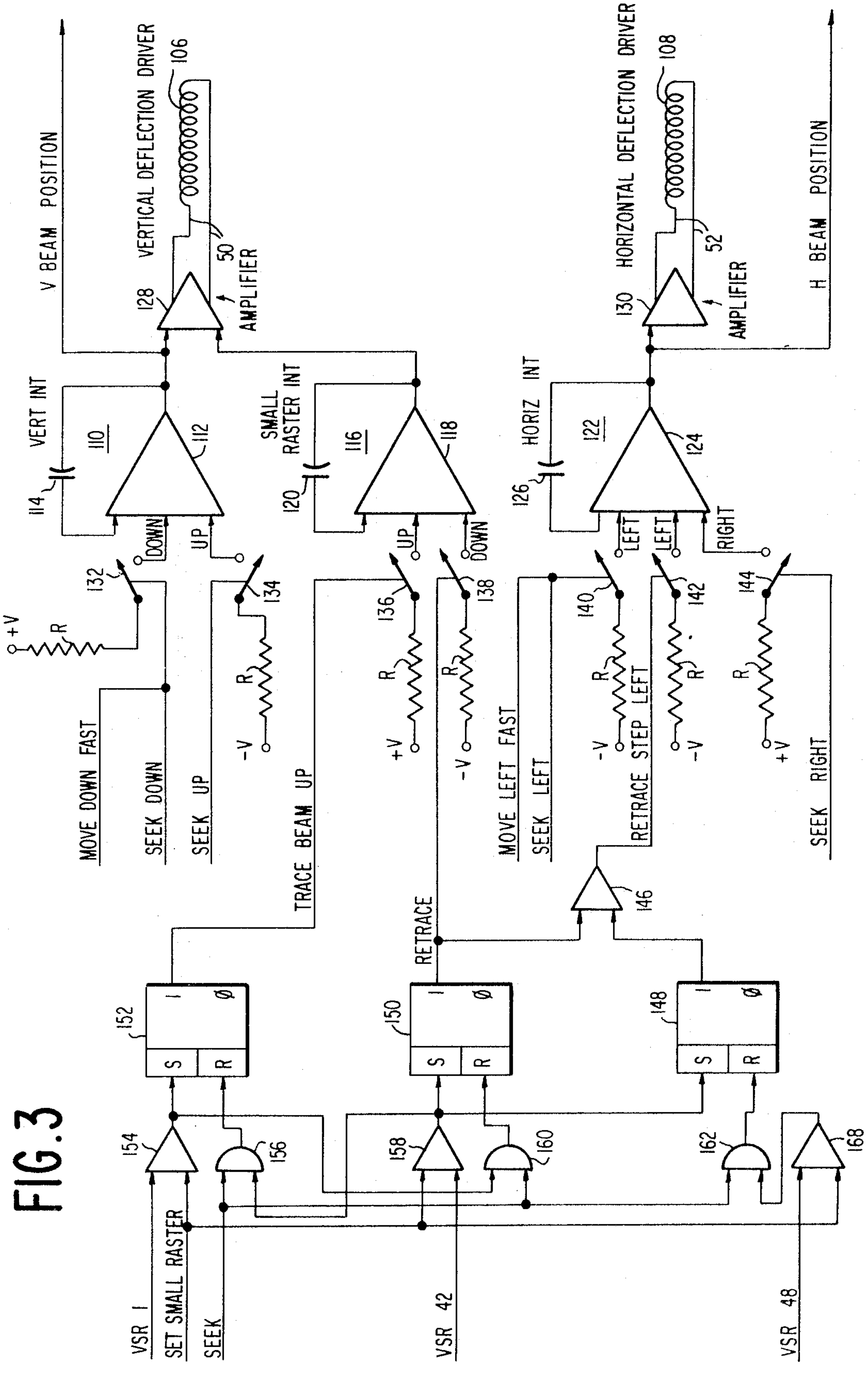
FIG. 3 is a logic block diagram of the deflection system of FIG. 2.

The SET SMALL RASTER output signal has three functions. It is applied to the downsweep control logic 78 causing the MOVE DOWN FAST output signal to be removed. Thus, the MOVE DOWN FAST deflection of the beam is stopped. The SET SMALL RASTER signal is also applied as an input to the deflection controls 48 causing the deflection controls to enter into the small raster mode wherein it causes the beam to move in the raster pattern described above. The SET SMALL RASTER signal is also applied to the vertical reference storage 82. The other input to the vertical reference storage 82 is the V BEAM POSITION. As soon as the SET SMALL RASTER CONTROL signal is received by the vertical reference storage 82, it stores the present vertical beam position, which represents the vertical coordinate of position B (FIG. 3). The output of the vertical storage 82 is a vertical reference signal whose magnitude represents the vertical coordinate of position B. The latter signal will be used during the following SEEK MODE as will be described more fully hereafter.

During the first few upsweeps of the small raster pattern scan the beam will be encountering the timing mark 22. The first upsweep which does not encounter the timing mark 22 is sensed by the left of timing mark logic 84. At that time the logic 84 provides a LEFT OF TIMING MARK output signal. The logic 84 also has a complementary output referred to as the NOT LEFT OF TIMING MARK output signal. The LEFT OF TIMING MARK signal is connected to the horizontal reference storage 86. Also applied to the horizontal reference storage 86 is the H BEAM POSITION. At the time of occurrence of the LEFT OF TIMING MARK signal, the horizontal reference storage 86 detects the present horizontal beam position, which, referring to FIG. 1, represents the horizontal coordinate of the left edge of timing mark 22. The horizontal reference storage 86 adds a voltage proportional to one-half the horizontal length of the timing mark 22 to the detected voltage representing the present horizontal beam position. The voltage sum, which represents the horizontal coordinate at the middle of the timing mark is stored and provided as a horizontal reference at the output of the storage unit 86. Thus, the vertical reference and horizontal reference signals from units 82 and 86, respectively define the coordinates of reference position H (FIG. 1) and will be used during the following SEEK mode to move the beam to position H. (Note that according to the above explanation, position H should be vertically on the same level as position B. It is shown displaced therefrom for purpose of clarity).

As described previously in connection with FIG. 1, when the beam reaches the left edge of the timing mark 22 a fast horizontal sweep is initiated during the next upsweep of the raster pattern scan. The fast horizontal sweep, more specifically referred to as the FAST LEFT SWEEP, is under control of the MOVE LEFT FAST logic 90. The logic 90 receives the timing inputs from the counters as indicated on the input terminals thereto, and also receives the LEFT OF TIMING MARK signal. In response to the latter signal, and under control of the timing inputs, the logic 90 provides a MOVE LEFT FAST output signal which starts at the beginning of the next upsweep. The MOVE LEFT FAST output signal is connected to the deflection controls 48 and causes the deflection controls 48 to move the beam towards the left at a preset rate. The movement to the left in combination with the upsweep is indicated by portion CD of scan line 27 (FIG. 1). As described above, in connection with FIG. 1, the beam is moved left fast in between the timing mark area and mark area number nine for only 20 microseconds. Thus, in response to the input VSR20, the move left fast logic 90 turns off the MOVE LEFT FAST output. The result is that the remainder of the upsweep is not influenced by a sweep left, and the normal small raster pattern scan continues in mark area number nine. During the raster pattern scan of all mark areas, other than the timing mark area, the move left fast logic 90 is under control of the scan counter output SC20. At the beginning of the 20th upsweep, the scan counter 102 provides an output SC20 which controls the move left fast logic 90 to initiate the MOVE LEFT FAST output signal. Also, during this time, the turnoff of the MOVE LEFT FAST output signal is under control of the timing signal VSR30. Thus, at the start of the 20th scan in each mark area the beam is moved left for 30 microseconds and is stopped by the timing signal VSR30.

It will be noted that the MOVE LEFT FAST logic has two additional outputs. One is the NOT MOVE LEFT FAST output signal which is the complimentary signal of the MOVE LEFT FAST output signal. The NOT MOVE LEFT FAST output signal turns on as each mark area is reached by the beam and is connected to the count input of the mark area counter 100. Thus, each time the beam moves to a new mark area the mark area counter advances by one. The other output, which is referred to as the LATCH RESET output signal is applied to the mark decision logic 92 and the mark reject logic 94. This output signal and its function will be described more fully hereafter.

The LEFT OF TIMING MARK output signal, from timing mark logic 84, along with the NOT LEFT OF TIMING MARK output signal is applied to the allow video logic 88. The allow video logic 88 also receives the NOT MOVE LEFT FAST signal from the move left fast logic 90 and the timing signals VSR8, VSR16, and VSR30. The allow video logic 88 operates to provide a window or timing gate during which the system will accept MARK SENSE output signals. Thus, by referring to FIG. 1 it can be seen that for properly oriented raster pattern scans, the mark will lie somewhere around the middle of the upsweeps. By looking for mark sense outputs only during certain portions of each upsweep, the system is prevented from reading smudges or false marks which occur near the extremities of the upsweeps. Also, since the timing mark for a given line of mark areas is vertically displaced with respect to the marks themselves, the period during which the system looks for the timing marks is different than the period during which the system looks for the regular marks. Prior to receipt of a LEFT OF TIMING MARK signal, the allow video logic 88 generates an output control signal during each upsweep between times VSR16 and VSR30. Once the LEFT OF TIMING MARK signal has occurred, indicating that the upsweeps are now in the regular mark areas, the allow video logic 88 generates an output which lasts between times VSR8 and VSR30. The output from the allow video logic 88 controls the AND gate 74 to pass the MARK SENSE signals into the system at the proper times.

The inputs to the counters 96 and 100 have previously been explained. The inputs to scan counter 102 are from AND GATE 104 which provides a count input to counter 102 at the beginning of every upsweep. This is accomplished by providing the control signal input TRACE-UP from the deflection controls 48 as one input to AND GATE 104 and the timing input VSR1 as the other input to AND GATE 104. Thus, each time a new upsweep or scan is started the scan count advances by one. It will be noted that the 20th upsweep, occurring during the time that the output from scan counter 102 is SC20, is the one during which the beam is moved between mark areas.

During the time that the mark areas are being scanned under control of the apparatus described thus far, the MARK SENSE output signals are applied to the mark decision logic 92. The latter logic circuit also receives the signals DA1 through DA12 which identify the mark areas in the line presently being scanned. During the scan of each mark area if the mark decision logic 92 receives a predetermined minimum number of MARK SENSE signals it will provide an output on the MARK EXIST OUTPUT line which corresponds to the area scanned. The mark decision logic 92 also provides two other output control signals. They are the REJECT LIMIT output signal which is present when the mark decision logic receives a low number of MARK SENSE signals, and the MARK LIMIT output signal, which is present when the mark decision logic 92 receives a large number of MARK SENSE signals. The latter two outputs are applied to mark reject logic 94 which operates to provide MARK REJECT outputs indicating that certain of the MARK EXIST outputs from mark decision logic 92 may be rejected because they are probably the result of partial erasures.

When the beam just starts the 20th upsweep of mark area number 12, the output of scan counter 102 will be SC20 and the output of mark area counter 100 will be DA12. The position of the beam at the time of occurrence of the latter two outputs is indicated by position G on line 27 in FIG. 1. The latter two outputs are applied to AND GATE 70, the output of which is applied through OR GATE 68 to the set input terminal of SEEK latch 66. The SEEK latch 66 is set causing a SEEK output. The SEEK output is applied to the timing mark detector 80 causing the timing mark detector 80 to remove the SET SMALL RASTER output from the input to the deflection controls 48. The result is that the small raster sweep is turned off. The SEEK output is also connected to the left of timing mark logic 84 and the move left fast logic 90. It operates to reset both of these units so that they are prepared for detecting the left of timing mark in the next line. The SEEK output signal is also applied, as described above, to the SEEK control unit 54 to begin the SEEK mode. Since it is assumed that the X and Y inputs from the external means, such as the central processing unit, are applied only at the start of operation for each document, there will be no external X and Y inputs at this time applied to the SEEK control input terminals 62 and 64. However, also as described previously, the H REFERENCE and V REFERENCE signals, which represent the coordinates of the position H (FIG. 1) will be applied to the SEEK control input terminals 62 and 64. The SEEK control unit 54 then operates in a manner described above to cause the deflection controls 48 to deflect the beam to position H. Following this, the SEEK END signal starts the sequence of detecting the timing mark, and performing raster scans on the mark areas of the second line in the same manner as described above for the first line.

FIG. 3 shows the details of the deflection controls 48 (FIG. 2) in combination with the output lines 52 and 50, and the deflection coils 106 and 108. The basic apparatus for vertical deflection includes a vertical integrator 110, a small raster integrator 116, amplifier 128 and vertical deflection coil 106. The basic horizontal deflection unit includes horizontal integrator 122, amplifier 130, and horizontal deflection coil 108. The vertical integrator 110 includes operational amplifier 112 and feedback capacitor 114; the small raster integrator 116 includes operational amplifier 118 and feedback capacitor 120; the horizontal integrator 122 includes operational amplifier 124 and the feedback capacitor 126. The use of integrators of the type described herein along with the amplifiers and the deflection coils is well known in the art of optical scanning systems. Generally the polarity and amplitude of the current or voltage input to the integrator determines the rate of change and the slope of the output signal. The integrator outputs are applied to the deflection amplifiers which drive the associated deflection coils in accordance with the integrator outputs. As will be apparent to anyone of ordinary skill in the art the greater the slope at the integrator output the faster the movement of the beam. The slope rates are controlled by switchably connecting precision voltage sources through precision resistors to the integrator inputs. Thus, as illustrated in FIG. 3, a switch 32, when closed, connects a positive voltage source through a precision resistor R to the integrator 110, causing the beam to be deflected down at a rate determined by the voltage source and the resistor. A switch 134, when closed, connects a negative voltage through a precision resistor R to the input of integrator 110 causing the beam to be deflected up at a rate determined by the voltage source and the value of the precision resistor. In a like manner, switches 136 and 138 provide up and down controls to integrator 116, and switches 140, 142, and 144 provide left and right controls to the horizontal integrator 122.

The logic which forms a part of the deflection controls 48 includes a trace beam up latch 152, a retrace latch 150, a retrace step time latch 148, AND GATES 146, 154, 158 and 168, and OR GATES 156, 160 and 162. The operation of the deflection controls of FIG. 3 will now be described.

During the SEEK mode, the SEEK control 54 (FIG. 2) may provide either a SEEK UP input signal or a SEEK DOWN input signal to the deflecton controls, and also may provide either a SEEK LEFT input signal or a SEEK RIGHT input signal to the deflection controls. The SEEK DOWN input signal controls switch 132 such that when the SEEK DOWN signal occurs switch 132 closes connecting a positive input current to the vertical integrator 110 resulting in deflection of the beam in a downward direction. Electronic switches having control terminal inputs for turning them on and off may be used for the input switches to the integrators. Other types of switches may also be used. If a SEEK UP signal occurs switch 134 will be closed causing the beam to be deflected in an up direction. The voltage output from vertical integrator 110 represents the V BEAM POSITION and is applied to the SEEK control 54 (FIG. 2) and other logic units as indicated in FIG. 2. When either the SEEK DOWN or SEEK UP inputs are removed, the respective switches are opened and the output of a vertical integrator is held in its present position. The SEEK LEFT and SEEK RIGHT signals control switches 140 and 144, respectively, to cause left and right deflection, of the beam respectively in the same manner as described above for the SEEK DOWN and SEEK UP signals.

When the beam reaches the reference position as commanded by the SEEK input signals, the SEEK input signals will be removed and the V BEAM POSITION and H BEAM POSITION will represent the reference position of the beam. As described above, in connection with FIG. 2, following the SEEK mode, the MOVE DOWN FAST output signal is generated. The latter signal also controls switch 132 thereby closing switch 132 and causing the beam to move directly down. It will be noted that during the existence of the MOVE DOWN FAST input signal, all of the switches 140 through 144 connected to the input of the horizontal integrator, are open and thus there is no horizontal movement of the beam.

The next step in the sequence is that the MOVE DOWN FAST signal is turned off and the SMALL RASTER signal is turned on. Note that when the MOVE DOWN FAST signal is turned off the output of the vertical integrator 110 is held at the position representing the bottom of the raster (indicated by the letter B in FIG. 1). Also note that the V BEAM POSITION is not derived from the output of the small raster integrator and, thus, is not effected by the vertical excursions of the beam resulting from the operation of the small raster integrator.

The small raster pattern scan is executed by the apparatus as follows: Following the occurrence of the SET SMALL RASTER signal the AND GATE 154 is energized at time VSR1 and the trace beam up latch 152 is set. The TRACE BEAM UP output signal closes switch 136 causing the beam to be deflected upward at a rate determined by the voltage source and precision resistor connected to the switch 136. The TRACE BEAM UP output signal is also used as a control signal for other units in FIG. 2, as described above. At time VSR43 the AND GATE 158 is energized causing the trace beam up latch to be reset and the retrace latch 150 to be set. Switch 136 thus opens, stopping the upsweep of the beam, and switch 138 closes, causing a downsweep of the beam. It will be noted that since the flyback during the raster scan is to be performed at a much faster rate than the upsweep the negative current into integrator 116 is the result of switch 138 being closed is greater than the positive current into integrator 116 as the result of switch 136 being closed. The output of AND GATE 158 also sets the retrace step time latch 148, and the outputs from the retrace step time latch 148 and the retrace latch 150 are connected to AND GATE 146. The output from the AND GATE 146 closes switch 142 causing the beam to move left at the same time that it is moving down. The result is that during flyback the beam moves down and to the left. At time VSR48 the AND GATE 168 is energized. The output therefrom passes through OR GATE 162 and resets the retrace step time latch 148. At the next VSR1 time the trace beam up latch 152 is again set and the retrace latch 150 is reset via the OR GATE 160. When the SEEK input occurs all of the latches are reset via the OR GATES 156, 160 and 162.

Figure 4:
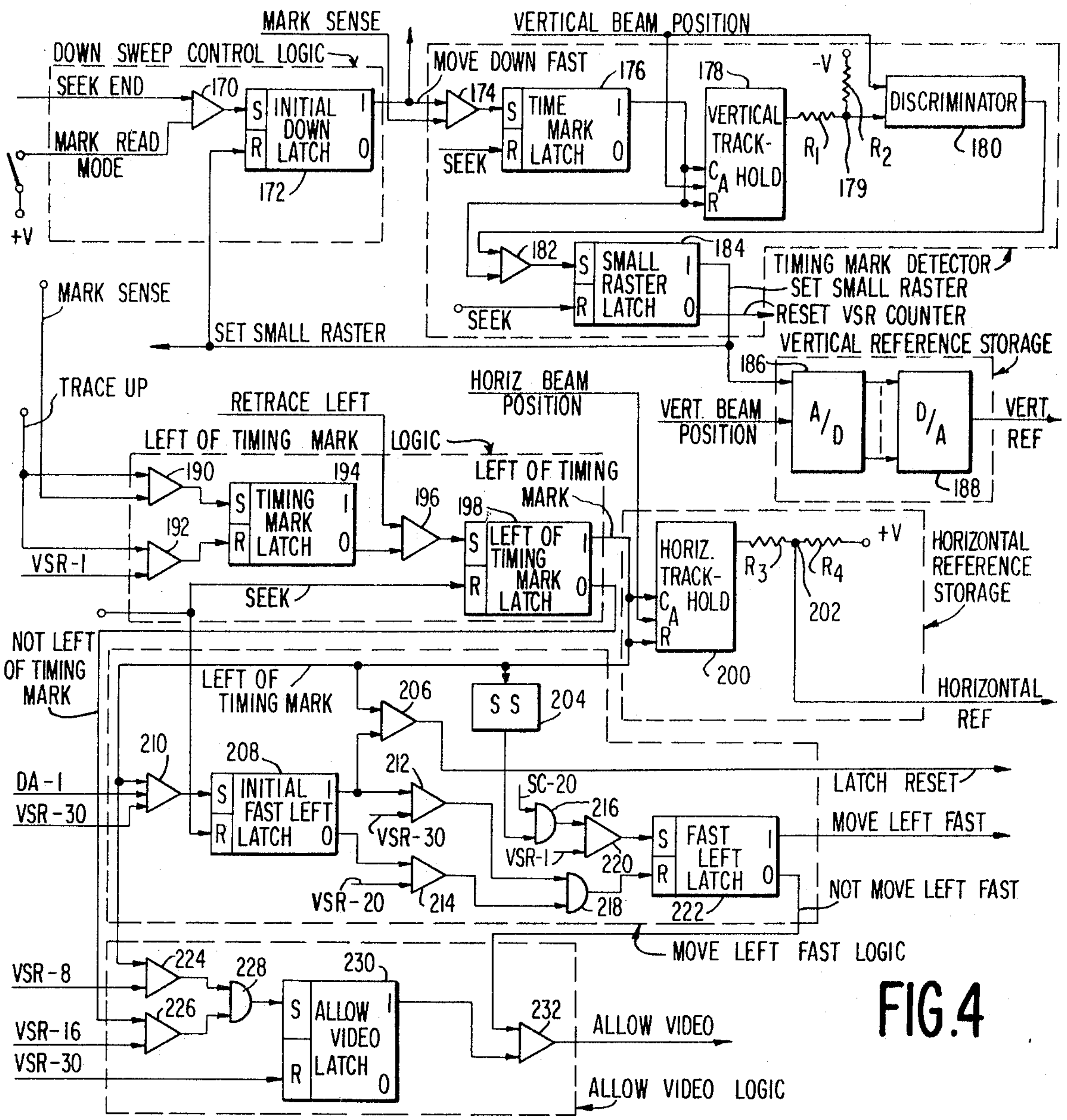
FIG. 4 is a logic block diagram of that portion of FIG. 2 which provides the controls to the deflection controls of FIG. 3.

The details of the logic for providing the control inputs to the deflection controls 48 (FIG. 2) is illustrated in FIG. 4. As shown broadly in FIG. 2, this logic comprises blocks 78 through 90. The logic elements in FIG. 4 corresponding to particular logic blocks of FIG. 2 are enclosed in dashed lines and labeled with the same names as the blocks of FIG. 2.

The downsweep control logic includes AND GATE 170 and initial down latch 172. When the SEEK END output signal occurs, AND GATE 170 is energized, thus setting the initial down latch 172 and bringing up the MOVE DOWN FAST output from initial down latch 172. The SET SMALL RASTER signal is connected to initial down latch 172 for resetting the latch.

The timing mark detector comprises AND GATES 174 and 182, a time mark latch 176, a small raster latch 184, a vertical track hold circuit 178, a discriminator 180, and a voltage divider comprising resistors R1 and R2. The analog input to the A input terminal of track hold circuit 178 is the V BEAM POSITION signal. The C and R control input terminals of the track hold circuit 178 are connected to the output of the time mark latch 176. The vertical track hold circuit operates as follows: In the absence of inputs at terminals C and R, the circuit 178 follows the voltage input at terminal A. When inputs are applied at terminals C and R the track hold circuit operates to hold the analog voltage presently applied to the A terminal. This analog voltage will be held and applied to the output of the track hold circuit 178 until such time as the control inputs are removed from terminals C and R. Track hold circuits which operate in this manner are known, and are described in commonly assigned U.S. Pat. application Ser. No. 619,226, filed Feb. 28, 1967, for "High-Speed Registration Techniques for Position Code Scanning," by William Hardin, et al.

The timing mark detector logic operates as follows: The MOVE DOWN FAST output from the initial down latch 172 of the downsweep control logic energizes the upper input of AND GATE 174. The first MARK SENSE output occurring after the upper input of AND GATE 174 is energized turns on AND GATE 174 and provides an output which sets the time mark latch 176. Thus, the time mark latch 176 will e set when the beam first encounters the timing mark. The vertical track hold circuit 178 will store an analog voltage which represents the vertical coordinate of the timing mark. The output voltage of the track hold circuit 178 is applied through a voltage divider comprising resistors R1 and R2 and voltage source −V to a discriminator 180. The voltage source and the resistors of the voltage divider are adjusted to add a small negative voltage to the output of the vertical track hold circuit. The addition of a small negative voltage causes the voltage at terminal 179 to represent the vertical coordinate of a position (such as position B in FIG. 1) which is a predetermined distance below the timing mark.

A second input to the discriminator 180 is the V BEAM POSITION. When the vertical beam reaches the reference point B the two inputs to the discriminator 180 will be equal thereby causing an output signal from the discriminator to be applied to the upper input terminal of AND GATE 182. Since the lower input terminal of AND GATE 182 will already have been energized by the output from time mark latch 176, the AND GATE 182 will provide an output which sets the small raster latch 184. When set, the output from the small raster latch 184 is the SET SMALL RASTER output signal. The time mark latch 176 and the small raster latch 184 remain in the set condition until reset by a SEEK input.

The vertical reference storage may comprise an analog to digital converter 186 and a digital to analog converter 188. The purpose of these converters is to digitally store the vertical coordinate of the reference position B. The SET SMALL RASTER output signal, when turned on, passes the present V BEAM POSITION signal into the analog to digital converter, wherein the vertical coordinate representing position B is converted into a digital value. This value is held in an output register of the converter 186, or in an input register of the converter 188, thus causing an analog output corresponding to the vertical coordinate of reference position B to be held at the output of the converter 188.

The left of timing mark logic comprises AND GATES 190, 192 and 196, timing mark latch 194, and left of timing mark latch 198. The operation of the left of timing mark logic is as follows: During the SEEK mode the left of timing mark 198 will be reset, thus providing a NOT LEFT OF TIMING MARK output signal, indicating that the beam has not yet reached the left edge of the timing mark. During the small raster scan, as discussed above, the deflection controls 48 (FIG. 2) provide a TRACE UP output signal during the upsweep of the beam and a RETRACE LEFT output signal during flyback. As long as the beam has not yet come to the left end of the timing mark the MARK SENSE output signal applied to gate 190 during the upsweep will set the timing mark latch 194. During flyback AND GATE 196 will not be energized because the timing mark latch 194 will be in the set state. At time VSR1 of every upsweep AND GATE 192 is energized, thus resetting the timing mark latch 194. The setting and resetting of timing mark latch 194 continues until the first upsweep which misses or appears to the left of the timing mark. During this upsweep AND GATE 190 will not be energized and consequently, the timing mark latch will remain in the reset condition. On the next flyback AND GATE 196 will become energized setting the left of timing mark latch 198 causing the LEFT OF TIMING MARK output to occur.

The horizontal reference storage comprises a horizontal track hold circuit 200, a voltage divider comprising resistors R3 and R4, and a +V source. The horizontal track hold circuit 200 operates in the same manner as the vertical track hold circuit 178. The analog input to the track hold circuit 200 is the H BEAM POSITION, and since the LEFT OF TIMING MARK output signal is applied to the control input terminals of the track hold circuit 200, the stored or held voltage in the track hold circuit represents the horizontal coordinate at the left of the timing mark. The voltage divider R3, R4 adds a small voltage to the output of the track hold circuit 200 causing the voltage at terminal 202 to represent the horizontal coordinate of substantially the middle of the timing mark 22.

The move left fast logic, as described above, operates to move the beam between the mark areas and comprises AND GATES 200, 210, 212, 214, and 220, OR GATES 216 and 218, initial fast left latch 208, fast left latch 222, and single shot 204. The move left fast logic operates as follows: In response to the LEFT OF TIMING MARK output, the single shot 204 provides an output pulse having a duration at least long enough to last until the beginning of the next upsweep. The duration of the single shot 204 output pulse may be 48 microseconds. The output pulse passes through OR GATE 216 and energizes the upper input of AND GATE 220. At time VSR1 of the following upsweep, the fast left latch 222 is set via the AND GATE 220 resulting in a MOVE LEFT FAST output. During this time the initial fast left latch 208 will be in the reset condition. As a result, at time VSR20 of the upsweep AND GATE 214 will provide an output which passes through OR GATE 218 and resets the fast left latch 222. As pointed out above, the move left fast output remains on for only 20 microseconds, between counts VSR1 and VSR20, when the beam passes from the timing mark area to the mark area number nine.

At time VSR30 of the same upsweep, AND GATE 210 will become energized and provide an output which sets the initial fast left latch 208. The latch 208 will remain in the set condition until the next SEEK mode. All subsequent setting and resetting of the fast left latch 222 is controlled by timing inputs VSR1 and VSR30 during scan 20. As illustrated, when scan 20 occurs, the SC20 signal passes through OR GATE 16. At time VSR1 of scan 20, AND GATE 220 provides an output which sets the fast left latch 222. At time VSR30, the AND GATE 212 becomes energized providing an output which passes through OR GATE 218 and resets the fast left latch 222. Thus, as described above, when the beam moves fast left between mark areas the fast left movement occurs for 30 microseconds between times VSR1 and VSR30. It should also be noted at this time that when the initial fast left latch 208 is set by the output from AND GATE 210 the AND GATE 206 becomes energized providing a latch reset output. The latch reset output is used to control certain logic in the mark decision logic circuit 92 and the mark reject logic circuit 94 (FIG. 2), which will be described more fully hereafter.

The allow video logic, which operates to gate the MARK SENSE signals into the system only during specified times, comprises AND GATES 224, 226, and 232, OR GATE 228, and an allow video latch 230. During the time that the beam is scanning the timing mark the ALLOW VIDEO output, which is connected to gate 74 in FIG. 2, is present between VSR16 and VSR30 of every upsweep. During this time, the NOT LEFT OF TIMING MARK signal will energize the upper input to AND GATE 226, thus allowing the timing signal VSR16 to pass through AND GATE 226 and OR GATE 228 to set the allow video latch 230. The upper input to AND GATE 232 will be energized except during the time that the beam is moving between mark areas. The allow video latch is reset by timing signal VSR30 and, thus, the ALLOW VIDEO output signal is terminated at time VSR30. Once the beam passes the timing mark, the LEFT OF TIMING MARK output signal will energize the upper input to AND GATE 224 and the upper input of AND GATE 226 will no longer be energized. Now, the allow video latch 230 will be set at time VSI8 via AND GATE 224 and OR GATE 228.

In the above discussion of FIG. 2 it was pointed out that the mark decision logic 92 operates during the raster scans of the mark areas to accumulate the MARK SENSE outputs and provide an indication of whether or not a mark exists in the particular mark areas. The mark decision logic 92 is illustrated in detail in FIG. 5 and comprises a video counter 240, an invert gate 242, an OR GATE 244, AND GATES 246 through 268, and mark latches 270 through 292. The outputs from the mark latches, when present, indicate that a mark exists in the corresponding mark area. For example, an output from mark latch 272 indicates that a mark exists in mark area 11. In the specific example described herein, a mark will be identified if a minimum of five MARK SENSE output pulses are detected during the raster scan of any one mark area. If desirable, following the scan of the 12 mark areas in a line, the mark latch outputs may be fed into a computer by connecting the outputs to respective AND GATES (not shown) and energizing them at the proper time. All of the mark latches are reset by the LATCH RESET signal which occurs at the beginning of scanning of the line of mark areas. (Generation of the LATCH RESET signal is explained in connection with FIG. 4).

The video counter 240 is reset to a reference value, such as zero, in response to each MOVE LEFT FAST signal. The latter signals occur when the beam is moving between mark areas, and thus the counter 240 will begin at zero when the beam begins a raster pattern scan of each new mark area. During the raster pattern scan of an area the mark sense outputs are applied to the count input terminal of the video counter 240 and accumulated therein. There are two outputs indicated from the video counter 240. The first is the MARK LIMIT output signal which is present whenever the counter contains a count of 15 or above. The second is the REJECT LIMIT output which is present whenever the video counter 240 attains a count of five or above. The REJECT LIMIT signal and the MARK LIMIT signal are applied to the OR GATE 244 whose output is referred to as a MARK signal and represents the existence of a mark in the area presently being scanned. The MARK signal from OR GATE 244 operates to set one of the mark latches 270 through 292. The particular mark latch which is set depends upon the particular mark area presently being scanned. For example, during the raster pattern scan of the ninth mark area, the signal DA1 will be present. AND GATE 268 will be energized and mark latch 292 will be set. The output from mark latch 292 thus indicates that a mark exists in mark area number nine. The remaining mark latches are set in response to the coincidence of the mark signal with one of the timing signals DA2 through DA12 as illustrated in FIG. 5.

As described above in connection with FIG. 2, the mark reject logic 94 operates to provide an indication of the strength of the marks in the mark areas. The details of the mark reject logic are illustrated in FIG. 6. The mark reject logic is particularly useful in those situations where the documents are used such that there is only one mark per line of mark areas. In such circumstances, as discussed above in connection with FIG. 1, a common error is to first place the mark in the area adjacent to the correct area, partially erase the incorrect mark and then insert the mark in the correct area. This is indicated by partial mark 28 in mark area number four and mark 24 in mark area number three of FIG. 1. If such were the case, the mark decision logic of FIG. 5 would provide two outputs. The first indicating that there is a mark present in area number four and the second indicating that there is a mark present in area number three. The mark reject logic of FIG. 6 is designed to provide an indication that the mark indicated as existing in area number four is a weak mark. It will be apparent to anyone of ordinary skill in the art that a weak mark could e rejected outright by merely raising the number of MARK SENSE outputs required to indicate a mark. However, it is often better to register a weak mark as a mark with the notation that it is weak. This allows the programmer or observer to decide whether or not he wants to accept the weak mark as a valid mark or reject it. For example, if the only mark indicated in an entire line happens to be a weak mark, the programmer or observer will probably want to accept the mark as a valid mark. However, if there are two marks indicated as being in a line, then the observer or programmer knows that the weak mark is probably the result of a partial erasure and should not be accepted as a valid mark.

It will be apparent to anyone of ordinary skill in the art that 12 separate output terminals from FIG. 6 may be provided such that a signal on any one of the 12 output terminals indicates that the mark in the corresponding mark area happens to be a weak mark. However, instead of 12 output terminals, the specific apparatus of FIG. 6 uses only four output terminals, shown respectively by the output lines 324 through 330. The reason for this will become apparent from the following discussion.

The apparatus of FIG. 6 includes OR GATES 300 through 306, AND GATES 308 through 314, and REJECT LATCHES 316 through 322. From the inputs applied to the OR GATES it can be seen that there is an output at OR GATE 300 during the raster scans of mark areas 12 (DA12), eight (DA2), and four (DA6). Thus, there exists an ambiguity in that when an output from OR GATE 300 occurs it is not known which of the latter three mark areas is being scanned. In most cases, this ambiguity is unimportant as will be apparent from the following discussion. The output of gate 300 provides one input to AND GATE 308. The other inputs are SC20, VSR40, REJECT LIMIT, and NOT MARK LIMIT. The NOT MARK LIMIT signal is derived from the output of the INVERT GATE 242 of FIG. 5, and is present provided the count in video counter 240 is below 15. Thus, if during the raster pattern scan of any one of the mark areas 12, eight or four, the video counter 240 receives between 5 and 15 MARK SENSE pulses (indicating that a mark is present but that it is a weak mark), at time VSR40 of the 19th scan, the AND GATE 308 will be fully energized, thus setting the REJECT LATCH 316. The signal output on lead 324 indicates that the mark in either area 12, eight or four, is weak. The reason why this seeming ambiguity is not really an ambiguity at all is because the signals on the outputs of the MARK LATCHES (FIG. 5) will indicate the area in which the mark is located. Thus, the combination of outputs from FIG. 5 and FIG. 6 indicate the existence of the marks and whether or not they are weak marks. The remaining OR GATES 302 through 306, AND GATES 310 through 314, and REJECT LATCHES 318 through 322, operate in a manner similar to that described in connection with OR GATE 300, AND gate 308, and REJECT LATCH 316.

The inputs to the OR GATES 300 through 306 are spread out so that the output from any one OR does not represent adjacent mark areas on the document. The reason for doing this is because the type of error which we are concerned with is the partially erased mark in the adjacent area. If DA signals corresponding to adjacent areas were connected to the same OR GATE, and if one of the marks in the adjacent area was weak, the operator or computer would not know which of the two marks was the weak one. However, by connecting the DA signals as shown, resulting in effectively spreading out the mark areas, the operator or computer can tell which of the two adjacent marks is the weak one.

Aside from limiting the hardware involved, a reason for using four REJECT LATCHES rather than 12 REJECT LATCHES has to do with common computer inputs. Many types of computers receive digital data in 8-bit bytes (group of eight inputs). The 12 MARK LATCH outputs (FIG. 5) plus the four REJECT LATCH outputs (FIG. 6) may be conveniently sent to a computer, if desired, in two 8-bit bytes.

While the invention has been particularly shown and described with reference to a preferred embodiment thereof, it will be understood by those skilled in the art that various changes in form and details may be made therein without departing from the spirit and scope of the invention.

I claim:

1. Apparatus for reading marks on documents of the type having the following format: a plurality of groups of mark areas, each mark area in a group lying along a first coordinate of said document and each of said groups being displaced from one another along a second coordinate angularly disposed with respect to said first coordinate wherein a mark may or may not be in any of the mark areas, and a plurality of timing marks associated with and substantially in line with said groups respectively, said apparatus comprising:
   a. optical generator and sensing means for directing a beam at said document and providing a mark sense output signal when said beam encounters a mark on said document;
   b. beam control means for deflecting said beam in a first direction until a timing mark is encountered, and in successive raster patterns in said mark areas of the group of mark areas associated with said encountered timing mark; and
   c. means for providing a mark indicating output in response to a predetermined number of mark sense output signals occurring during the raster scan of any one mark area.

2. Apparatus as claim in claim 1 wherein said beam control means comprises:
   a. down sweep control means for deflecting said beam from a preestablished position downward along said second coordinate axis in a down sweep;
   b. timing mark detector means responsive to the first mark sense output signal occuring during said down sweep for stopping said down sweep at a reference position a predetermined distance below the mark which resulted in said first mark sense output signal and for generating a set small raster output signal;
   c. small raster control means responsive to said small raster output signal for deflecting said beam in a raster pattern defined by a plurality of successive second coordinate axis scans displaced a small amount along said first coordinate, a predetermined plurality of said scans defining a mark area; and
   d. first axis sweep control means for periodically deflecting said beam at a fast rate along said first axis to quickly sweep across the spaces between mark areas.

3. Apparatus as claimed in claim 2 further comprising means responsive to the last scan of said raster pattern scan on said last mark area in said group of mark areas for deflecting said beam to a new position below said last detected timing mark and initiating said down sweep control means.

4. Apparatus as claimed in claim 3 wherein said beam control logic further comprises mark area monitoring means for monitoring the mark area being scanned and for providing an output representing the particular mark area presently scanned by said beam, and scan counting means for counting the number of scans performed in each mark area.

5. Apparatus as claimed in claim 4 wherein said first axis sweep control means comprises:
   a. means for detecting the first scan of said raster pattern in which said beam does not encounter said timing mark and generating at that time a sweep left control signal;
   b. means connected to and responsive to the count within said scan counting means for generating a sweep left control signal when said counting means contains a count equal to said predetermined plurality of scans; and c. means responsive to the occurrence of each of said sweep left control signals for deflecting said beam along said first coordinate axis during a predetermined portion of the next scan of said raster scan.

6. Apparatus as claim in claim 1 wherein said means for providing a mark indicating output comprises:

a. mark sense counter means responsive to mark sense outputs applied thereto for accumulating said mark sense outputs and for providing first and second outputs representing respectively first and second predetermined minimum numbers of accumulated mark sense outputs, said second predetermined minimum being greater than said first predetermined minimum;

b. means for resetting said mark sense counter means when said beam moves between adjacent mark areas; and c. means responsive to the occurrence of either said first or second outputs from said mark sense counter means for providing an output indicating the existence of a mark and the mark area in which the mark is located.

7. Apparatus as claimed in claim 6 further comprising means responsive to the occurrence of said first output and the absence of said second output following the complete scan of a mark area for providing an output indicating that the mark in said mark area is a weak mark.

8. Apparatus as claimed in claim 5 wherein said means for providing a mark indicating output comprises:

a. mark sense counter means responsive to mark sense outputs applied thereto for accumulating said mark sense outputs and for providing first and second outputs representing respectively first and second predetermined minimum numbers of accumulated mark sense outputs, said second predetermined minimum being greater than said first predetermined minimum;

b. means for resetting said mark sense counter means when said beam moves between adjacent mark areas; and c. means responsive to the occurrence of either said first or second outputs from said mark sense counter means for providing an output indicating the existence of a mark and the mark area in which the mark is located.

9. Apparatus as claimed in claim 8 further comprising means responsive to the occurrence of said first output and the absence of said second output following the complete scan of a mark area for providing an output indicating that the mark in said mark area is a weak mark.

10. Apparatus for reading marks on a document comprising:

a. optical beam generating means for directing a beam towards said document;

b. optical sensing means for providing a video output signal when said beam encounters a mark on said document, first means for locating timing marks on said document each of which identifies coordinate position on said document for searching for marks, c. raster scan deflection means for deflecting said beam to cause successive raster scans of a plurality of areas on said document, said areas being substantially in line with said located timing marks and displaced from said timing mark and each other along said line;

d. means for detecting the number of video output signals resulting from the raster scan of each area;

e. means for maintaining a count corresponding to the area presently being scanned by said raster scan; and f. means responsive to said detecting means and said maintaining means for indicating the area in which a mark is located and the strength of said mark.

11. Apparatus for reading marks on documents of the type having the following format: a plurality of groups of mark areas, each mark area in a group lying along a first coordinate of said document and each of said groups being displaced from one another along a second coordinate angularly disposed with respect to said first coordinate wherein a mark may or may not be in any of the mark areas, and a plurality of timing marks associated with and substantially in line with said groups respectively, said apparatus comprising:

a. optical generator and sensing means for directing a beam at said document and providing a mark sense video output when said beam encounters a mark on said document;

b. timing mark locater deflecting means for deflecting said beam at a fast rate along said second coordinate in the vicinity of said timing marks;

c. means responsive to a mark sense video output corresponding to said beam encountering a timing mark during said last mentioned fast rate deflection for stopping the last mentioned deflection when the beam travels a predetermined distance past said timing mark, and storing the second coordinate of said position;

d. raster scan deflection means for causing said beam to be deflected in a small raster pattern starting from said position, said small raster pattern comprising successive mark seeking scans along said second coordinate with each scan being displaced along said first coordinate, said raster scan deflection means being enabled in response to the stopping of said fast deflection;

e. means detecting when said small raster scan no longer encounters said timing mark for deflecting said beam to the next adjacent mark area along said first coordinate, whereby said raster scan continues in said next adjacent mark area;

f. second coordinate storage means responsive to the position of said raster scan when it no longer encounters said timing mark for storing a second coordinate position reference having a predetermined relationship to the second coordinate position of said beam when said scan no longer encounters said timing mark;

g. scan counting means detecting when a predetermined number of scans has been performed in any mark area for deflecting said beam to the next adjacent mark area whereby said raster scan continues in said next adjacent mark area;

h. mark area monitor means responsive to the deflection of said beam between said mark areas for providing an output representing the mark area being scanned;

i. mark identifying counter means responsive to the mark sense video outputs occurring during the raster scan of each mark area for providing a count corresponding to the number of scans during the raster scan of an area which encountered a mark;

j. means responsive to the count in said mark identifying counter being above a first predetermined amount and the mark area output from said mark area monitoring means for providing an output which indicates the mark area in which a mark is located; and k. means responsive to said predetermined number of scans in the last mark area to be scanned for deflecting said beam to a position determined by said first and second stored coordinate positions and enabling said timing mark locater deflection means, and for disabling said raster reference deflecting means.